Nov. 22, 1949 — K. W. COUSE — 2,488,765
RELEASING MECHANISM FOR POWER TAKE-OFFS
Filed July 25, 1945 — 5 Sheets-Sheet 2
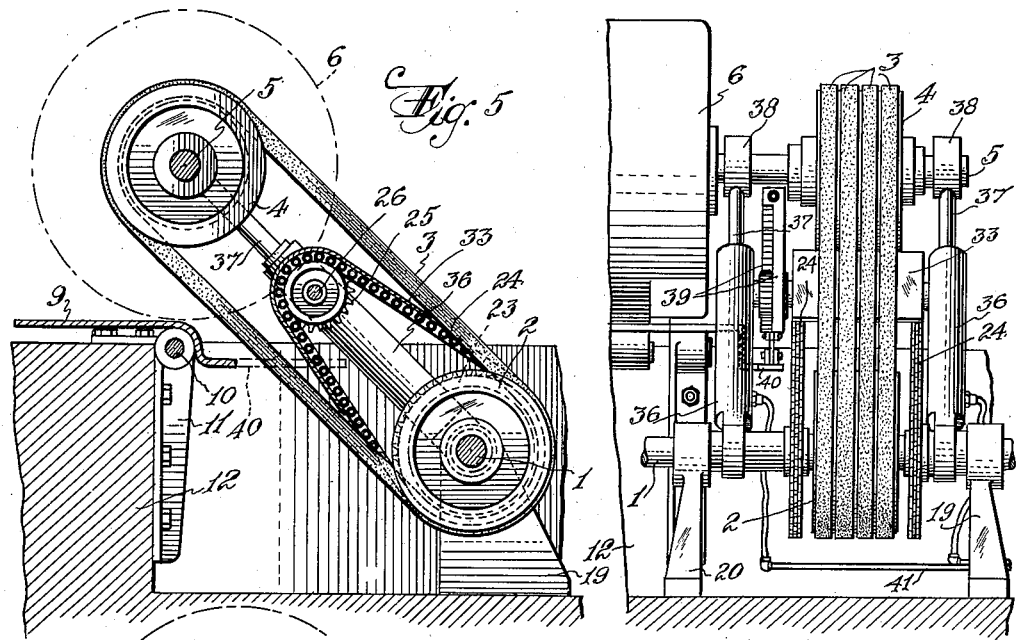
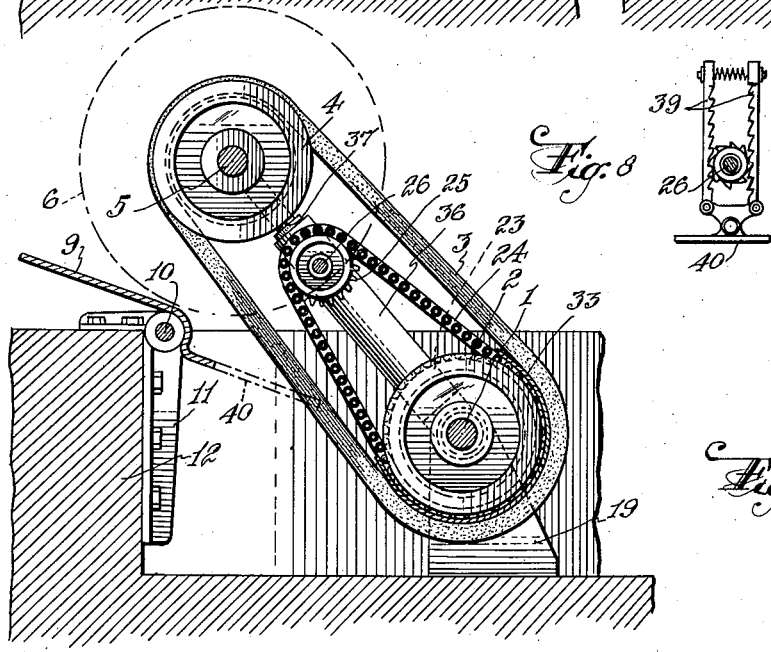
INVENTOR.
Kibbey W. Couse
BY A. D. T. Libby
Attorney.

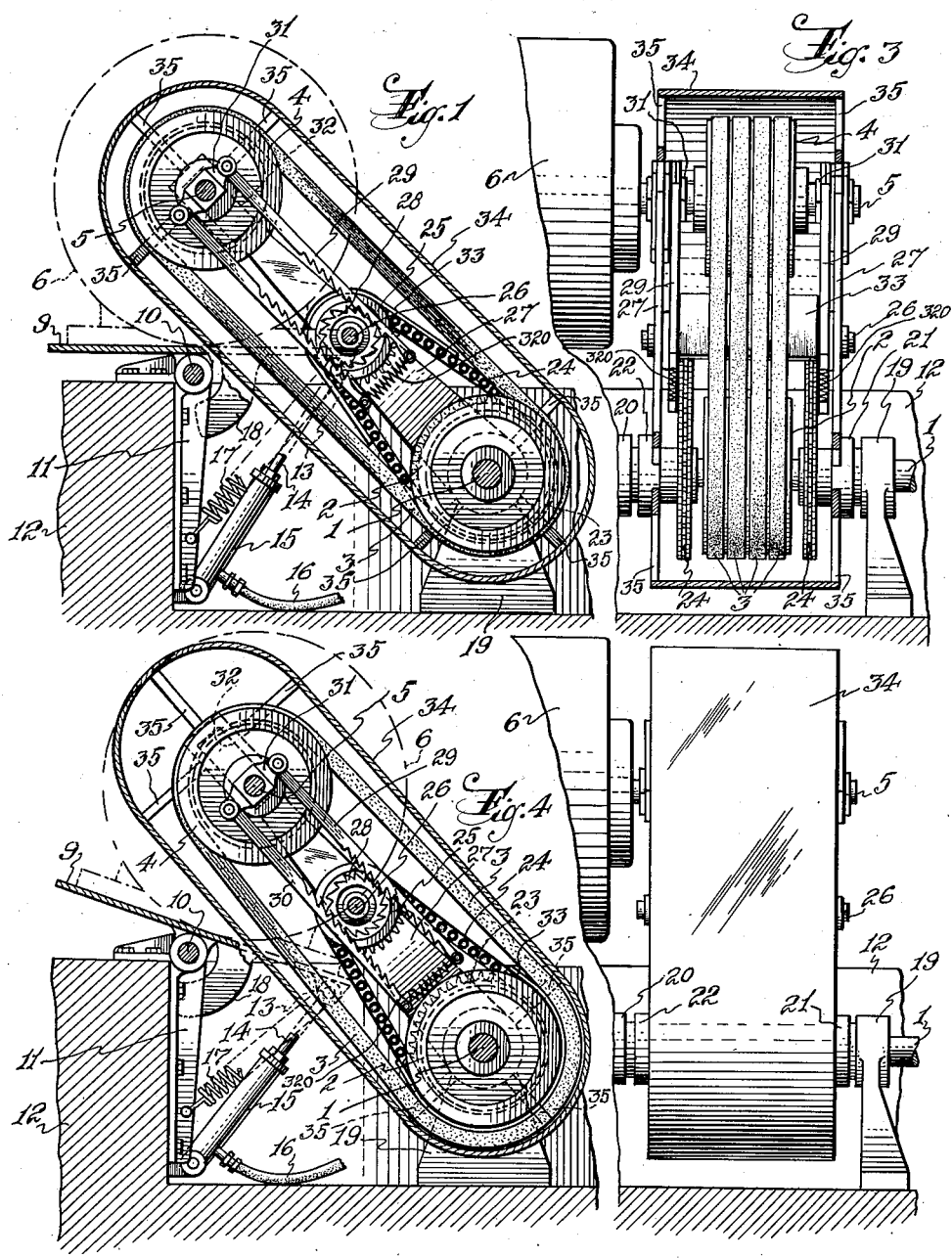

Nov. 22, 1949   K. W. COUSE   2,488,765
RELEASING MECHANISM FOR POWER TAKE-OFFS
Filed July 25, 1945   5 Sheets-Sheet 3
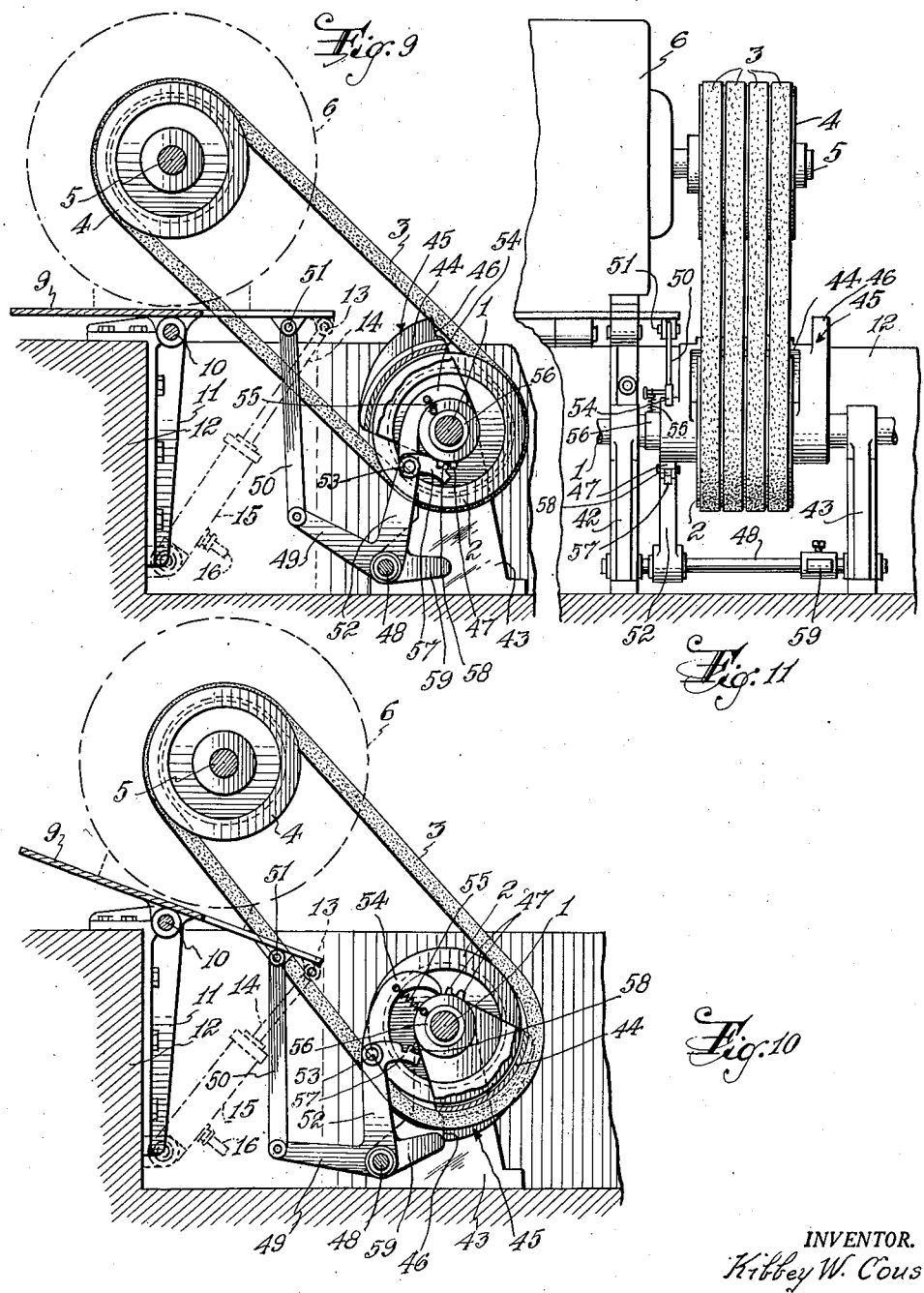
INVENTOR.
Kibbey W. Couse
BY A. D. T. Libby
Attorney.

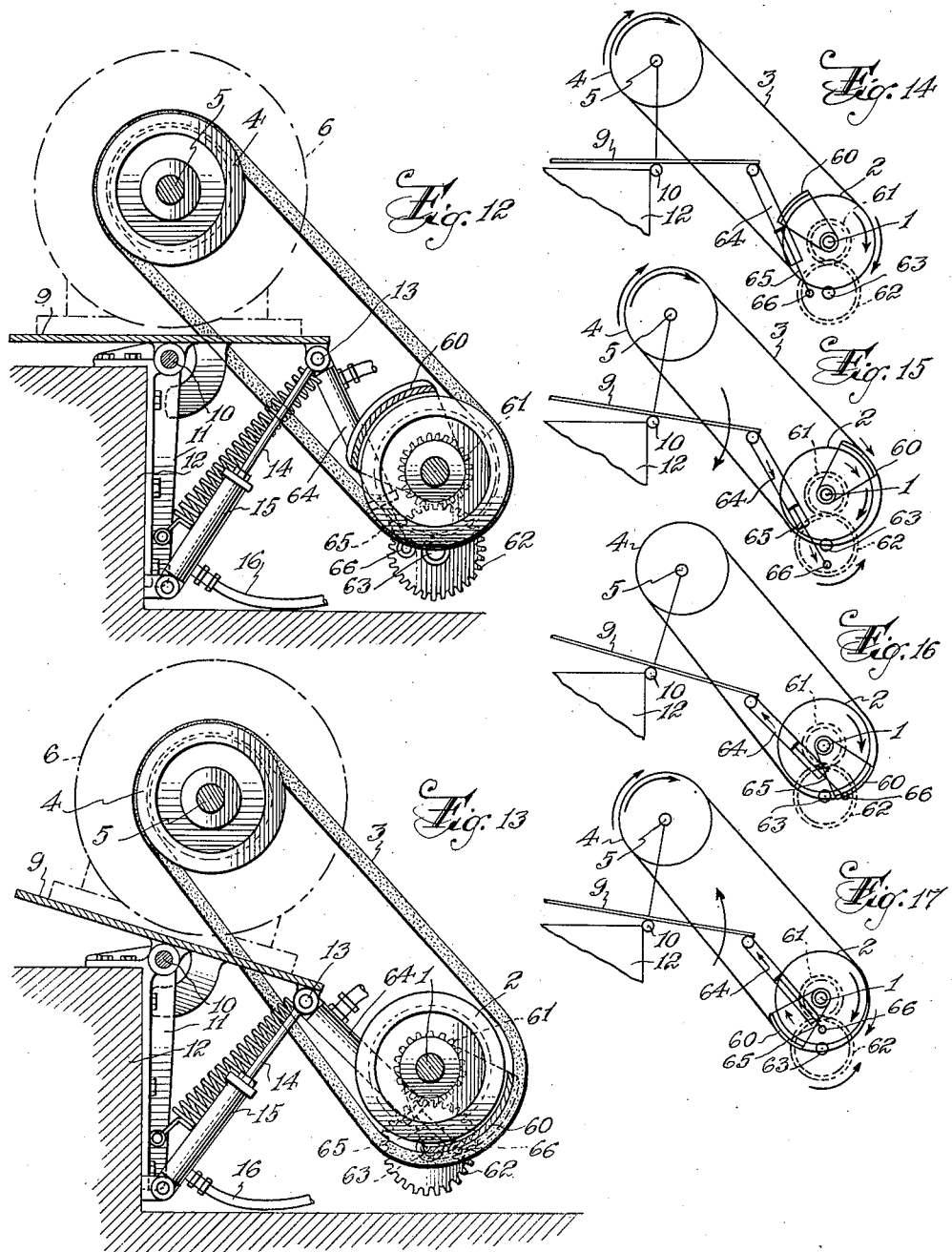

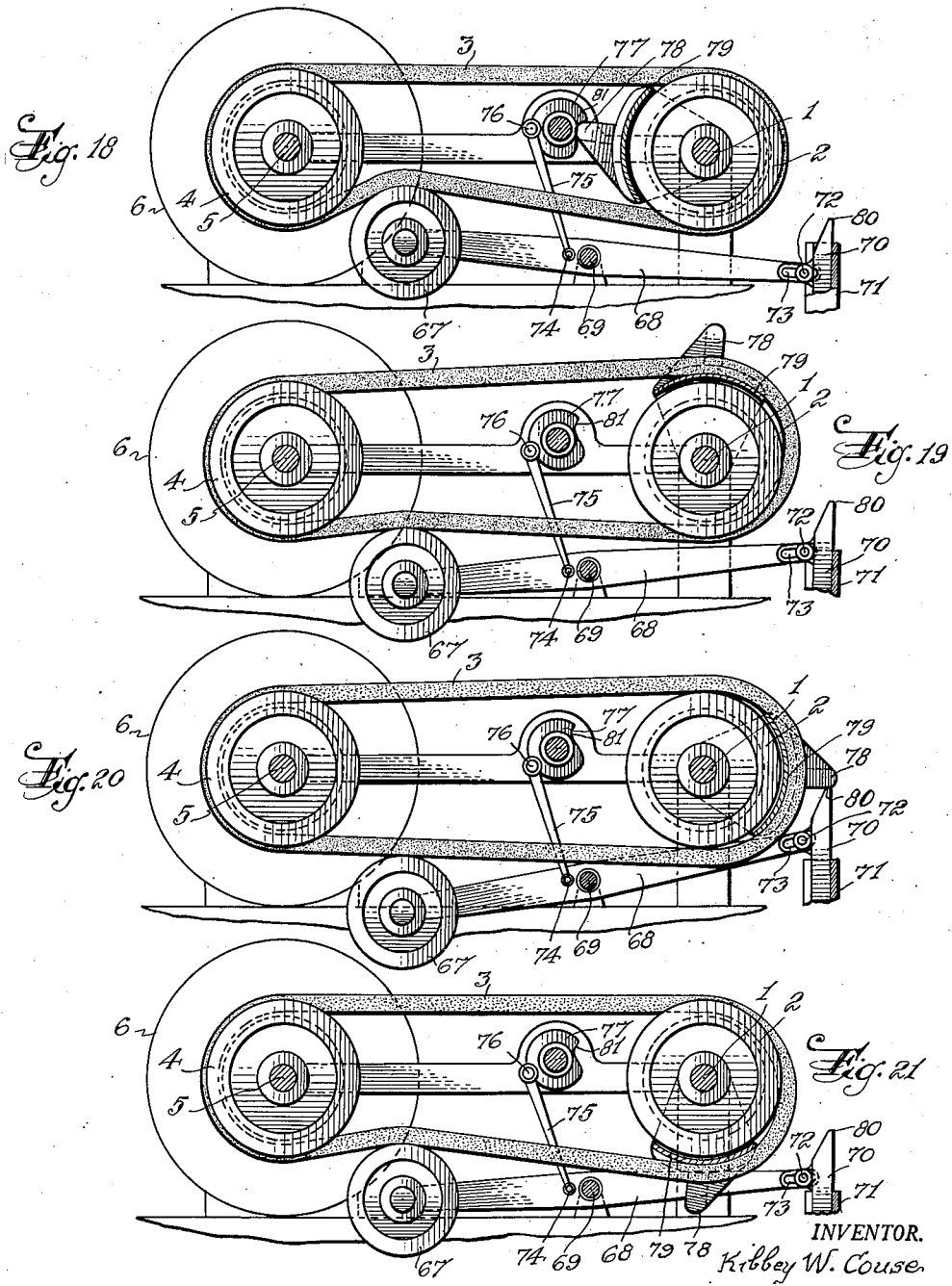

Patented Nov. 22, 1949

2,488,765

UNITED STATES PATENT OFFICE 2,488,765

RELEASING MECHANISM FOR POWER TAKE-OFFS

Kibbey Whitman Couse, Newark, N. J.

Application July 25, 1945, Serial No. 607,008

11 Claims. (Cl. 74—242.5)

This invention relates to a special type of power take off structure in which special means are provided for releasing the guiding connection between a driving pulley and a driven pulley mounted on the shaft of a unit of machinery. In my application S. N. 603,139, filed July 4, 1945, now Patent No. 2,458,255, dated January 4, 1949, I have shown and described an arrangement in which the belt means between the two pulleys can be lifted or moved away from the driving surface of the driving pulley.

My present invention is directed to different means for releasing or altering the driving characteristics of the driving pulley with respect to belt means passing between the two pulleys. My present invention is especially adapted for use in connection with V belts and the objects are accomplished by inserting between the driving pulley and the belt means a device which may take different forms as will be hereinafter disclosed.

In the drawings which are more or less schematic to illustrate the principles involved, Figure 1 is a view partly in section and partly in elevation of one form of my invention.

Figure 2 is a view similar to Figure 1 but with the driving belt moved to idle position.

Figure 3 is a view of Figure 1 looking from right to left.

Figure 4 is a view similar to Figure 3 but with the belt guard member in position.

Figure 5 is a view similar to Figure 1 but of a modified form of construction.

Figure 6 is a view similar to Figure 5 but with the driving belt in idle position.

Figure 7 is a view of Figure 5 looking from right to left.

Figure 8 is a fragmentary view of part of the structure operating the belt means.

Figure 9 is a view similar to Figure 1 but showing a further modified form of construction.

Figure 10 is a view of Figure 9 but showing the belt in idle position.

Figure 11 is a view of Figure 9 looking from right to left.

Figure 12 is a view similar to Figure 1 but showing a further modified form of construction.

Figure 13 is a view of Figure 12 but with the belt in idle driving position.

Figures 14, 15, 16 and 17 are diagrammatic views showing the different steps in the operation of the structure shown in Figures 12 and 13.

Figure 18 is a view of a further modified construction showing the belt in power driving position.

Figure 19 is a view similar to Figure 18 but with the belt releasing device in its initial stage of operation.

Figure 20 is a view similar to Figure 19 but with the belt in idle position.

Figure 21 is a view similar to Figure 20 but with the belt releasing device in one position of its turned movement toward the position of Figure 18.

Referring now to the drawings wherein like numbers refer to corresponding parts in the various views, 1 is a driving shaft having a driving pulley 2 fastened thereto. The pulley 2 is preferably provided with a surface to receive V belts 3 which are adapted to engage a pulley 4 fastened to a driven shaft 5 which extends from a unit of machinery 6, which is mounted on a base 9 pivoted at 10 to a fixture 11 carried on a support 12. Pivoted at 13 to the base 9 is a piston 14 forming part of an actuating device 15 which may be a hydraulic or compressed air cylinder operated through the medium of a pipe 16. Also fastened to the base 9 or adjacent pivot 13 is a spring 17 the opposite end of which is fastened to the fixture 11. This spring is utilized as a counter-balance. The base 9 is provided with stop arms 18 that are adapted to engage with support 12 to limit the tilting movement of the base 9 and apparatus carried thereby. Stop arms 18 can also react to support the weight of the unit 6 in an emergency should anything go wrong with the actuating device 15. The driving shaft 1 has suitable supports 19 and 20. Shaft 1 carries sleeves 21 and 22 upon which are freely mounted sprocket wheels 23 carrying chains 24, the opposite ends of which are carried on sprocket wheels 25, that are mounted on a cross shaft 26 carried by spaced arms 27. Shaft 26 also carries at its opposite ends ratchet wheels 28 adapted to be engaged by racks 29 and 30. These racks are supported at one end on a yoke 31 through which the shaft 5 passes, the yoke being slidably mounted in a slot 32 in the arms 27. Each pair of racks at their opposite ends are held together by a spring 320. Permanently fastened across the chains 24 is a web-like flexible member 33 which in length along the chains is sufficient to cover somewhat more than ½ the circumference of the driving pulley as is indicated in Figure 2. It will be noted in this preferred form of construction that the guard 34 is permanently fixed in position by a plurality of support arms 35 at each end of the guard. In the operation of this preferred form of my structure it is seen that when the unit 6 is tilted through the medium of the actuating device 15 the racks 29 will move the ratchet wheels 28 to turn the sprocket wheels 25 in clockwise direction together with the chains 24. This will carry the member 33 from the position shown in Figures 1 and 3 into the position shown in Figure 2 wherein the belt means 3 is lifted from the driving pulley into what may be termed an idle position. When it is desired to connect the driving pulley 1 with the driven pulley 4 the actuating device 15 is operated to tilt the apparatus back to the position of Figure 1. This will cause the racks 30 to operate on the ratchet wheels to move them in a clock-wise direction along with the chains and will move the member 33 back to position shown in Figure 1 when the belt 3 will be in full operative engagement with the driving pulley 2.

In Figures 5, 6 and 7 the arrangement of the chains and driving sprockets together with the member 33, carried by the chains, is substantially the same as Figures 1 and 2, but in this form the guard member 34 is not utilized. For the tilting of the unit 6 a pair of twin cylinders 36 are used having piston rods 37 which are connected to suitable collars 38 over the shaft of the unit 6. In this form the racks 39 are attached to an extension 40 of the support 9 so that when the unit 6 is tilted by the devices 36 and 37 the ratchet wheels will be operated simultaneously as in Figure 1 as the cylinders 36 are connected by the pipe 41 so as to operate in synchronism. If it is necessary, the actuating device 15, with its associated spring 17 may be utilized in conjunction with the device 36, where there is a very heavy torque required on the shaft 5. The operation of this structure so far as moving a belt means into an outer operative engagement with the driving pulley is substantially the same as in Figures 1 and 2. In the form shown in Figure 9 the shaft 1 is supported between the supports 42 and 43 and between these supports and on opposite sides of the guiding pulley 2 and belt means 3 and adjacent shaft 1 there is a U-shaped member 44, one arm of which has an extension 45 terminating in a flat portion 46. The other arm of the U-shaped member has teeth 47 thereon. Between the supports 42 and 43 is a shaft 48 carrying a bell crank lever having an arm 49 pivotally connected to a link 50 that is also pivoted at 51 to the support member 9. The other arm 52 of the bell crank lever has pivoted thereon at 53 a sickle-shaped pawl 54 which is in alignment with the teeth 47 on a collar portion 56 of the U-shaped member 44. A spring 55 is used to hold the pawl in operative position with respect to the teeth 47. The arm 52 has an extension 57 on which are provided teeth or notches 58 which cooperate with the teeth 47 as we will later explain. A stub arm 59 is positioned on the shaft 48 in such a manner that it may be angularly adjusted for the purposes which will later be explained.

When it is desired to idle the pulley 4 on the shaft 5 the actuating device 15 is set into operation and by tilting the support 9 upon the pivot 10 which causes the shaft 5 and its pulley 4 to move in arc from pivot 10 thereby shortening the distance between the shaft 5 and the shaft 1. This will cause a slack in the belts 3. At the same time link 50 depresses the arm 49 of the bell crank lever and the arm 52 is moved with its extension 57 so as to cause the teeth or notches 58 then in mesh with the teeth 47 to move the U-shaped member 44 in a clockwise direction until the base portion of the U member comes into engagement with inner surfaces of the V belts which although they are somewhat slack are still moving because of their contact with the pulley 2 thereby continuing the movement of the U-shaped member 44 in a clockwise direction around the outer surface of the pulley 2. This movement continues until the extension 45 with its flat surface 46 engages the stub arm 59 which at this particular time has been moved up to the position shown in Figure 10. At this part of the cycle in the operation the teeth 47 of member 44 have passed under the pawl 54 to a point just beyond the end of the pawl. This is to insure that the pawl 54 is in proper position to move the member 44 in a clockwise direction after the stub arm 59 has been moved out of the stop position shown in Figure 10 when the actuating device 15 moves the support 9 and unit 6 back to the position shown in Figure 9. The sickle-like pawl therefore gives enough movement to the U-shaped member 44 so that the top part of the belt means will engage the pulley 2, pick up the drive and carry the member 44 back to the position shown in Figure 9. In Figures 12 and 13 the mounting of the unit 6 and its tilting is substantially the same as in Figure 1 and the belt 3 moved into idle position by the U-shaped device 60 which functions in about the same manner as the U-shaped device 44 except that it is operated by gears 61 and 62, the gears 61 being attached to the device 60 while the gears 62 are mounted on a stub shaft 63 and is operated by a cylinder 64 having a piston 65 directly connected at 66 with the pinion 62. The operation of this structure is shown diagrammatically in Figures 14 to 17 inclusive so that a detailed description does not seem necessary except to mention that when the support 9 is tilted by the actuating device 15 the auxiliary actuating device 64 will start the device 60 toward belt releasing portion. This arrangement eliminates any danger of a dead center being encountered.

In the forms shown in Figures 18 to 21 inclusive an idler or belt tightener pulley 67 is carried on one end of the lever 68 pivoted at 69. Lever 68 is operated through the medium of a shoe 70 carried by guide 71 through the medium of a pin 72 carried in a slot 73. Pivoted at 74 to the lever 68 is a link 75 also pivoted at 76 to a cam 77 which is caused to rotate by operation of the lever 68 so that the cam will act on a nose 78 of a U-shaped member 79, thereby forcing the member 79 in a clockwise direction into engagement with the undersurfaces of the belt means and it will then be frictionally rotated by the pulley 2 and the belts 3 until the nose 78 engages a stop 80 on the member 70 then the parts will be in position shown in Figure 20. On withdrawing the stop 80, frictional engagement will carry the member 79 around to the position shown in Figure 21 and on to the position of Figure 18 when the nose 78 will engage the notch in the cam 81, since the lever 68, through the medium of the link will move the cam 77 to the stop position of Figure 18 and the belt 3 will then be back into power operating position.

From what has been said, it will be understood that various changes may be made in the details, without departing from the spirit of my invention or the scope of the appended claims.

What I claim is:

1. A releasing mechanism for a power take-off including a driving shaft with support means therefor and with a pulley on said shaft, a unit of machinery for absorbing the power from the driving shaft, carried on a pivotable support and having a pulley to be driven and belt means for running directly over said pulleys, mechanism for tilting the pivotal support and means brought into action by said tilting operation for passing a device between the driving pulley and the belt means for changing the power driving characteristics of the belt means.

2. A releasing mechanism for a power take-off including a driving shaft with support means therefor and with a pulley on said shaft, a unit of machinery having a pulley to be driven and belt means for running over said pulleys, a pair of sprockets rotatably mounted, one each on each side of the driving pulley but independent thereof, a pair of spaced sprockets operatively positioned between the driving and driven pulleys in alignment with said first pair of sprockets, chains carried by said sprockets, a belt lifting device bridging said chains but normally positioned out of lifting position and means for actuating said sprockets and chains to move said lifting device between the belt means and the driving pulley.

3. A releasing mechanism for a power take-off including a driving shaft with support means therefor and with a pulley on said shaft, a unit of machinery having a pulley to be driven and belt means for running over said pulleys, a pair of sprockets rotatably mounted, one each on each side of the driving pulley but independent thereof, a pair of spaced sprockets operatively positioned between the driving and driven pulleys in alignment with said first pair of sprockets, chains carried by said sprockets, a belt lifting device bridging said chains but normally positioned out of lifting position, a pair of rigid arms extending between the said unit of machinery and said driving pulley supports, a cross shaft between said arms for supporting one pair of said sprockets, ratchet wheels also carried by said cross shaft, means for moving said unit toward the driving pulley and means actuated by the movement of said unit to turn the ratchet wheels and sprockets to move the chains and said lifting device carried thereby into and out of belt lifting position as described.

4. A releasing mechanism for a power take-off including a driving shaft with support means therefor and with a pulley on said shaft, a unit of machinery having a pulley to be driven and belt means for running over said pulleys, a pair of sprockets rotatably mounted, one each on each side of the driving pulley but independent thereof, a pair of spaced sprockets operatively positioned between the driving and driven pulleys in alignment with said first pair of sprockets, chains carried by said sprockets, a belt lifting device bridging said chains but normally positioned out of lifting position, a pair of rigid arms extending between the said unit of machinery and said driving pulley supports, a cross shaft between said arms for supporting one pair of said sprockets, ratchet wheels also carried by said cross shaft, means for moving said unit toward the driving pulley and racks operatively positioned to be moved by said unit to engage said ratchet wheels to turn the same along with the sprockets to move the chains and said lifting device carried thereon into and out of belt lifting position as desired.

5. A releasing mechanism for a power take-off including a driving shaft with support means therefor and with a pulley on said shaft, a unit of machinery having a pulley to be driven and belt means for running over said pulleys, a pair of sprockets rotatably mounted, one each on each side of the driving pulley but independent thereof, a pair of spaced sprockets operatively positioned between the driving and driven pulleys in alignment with said first pair of sprockets, chains carried by said sprockets, a belt lifting device bridging said chains but normally positioned out of lifting position, a pair of rigid arms extending between the said unit of machinery and said driving pulley supports, a cross shaft between said arms for supporting one pair of said sprockets, ratchet wheels also carried by said cross shaft, means for moving said unit toward the driving pulley and a pair of racks, one on each side of the driven pulley and slidably mounted at their pulley ends on the extremity of said arm while their opposite ends engage the ratchet wheels and spring means for holding the racks in their engagement with said wheels.

6. A mechanism as set forth in claim 2 further defined in that the belt lifting device consists of a web-like flexible material of a length along the chains sufficient to cover at least one half the circumference of the driving pulley.

7. A mechanism as set forth in claim 1 further characterized in that said device is passed between the driving pulley and the belt means by gears, one of which is connected to said device and driven by another gear operatively connected thereto and means for turning said gears to move said device as described.

8. A mechanism as set forth in claim 1 further characterized in that said device is passed between the driving pulley and the belt means by a pair of gears, one of which is connected to said device and the other to a direct actuating means to move said belt changing means as described.

9. A mechanism as set forth in claim 1 further characterized in that said unit of machinery is mounted on a support which is tiltable toward the driving pulley with means for tilting the support and further characterized in that said device is generally U-shaped with the arms of the U positioned on opposite sides of the driving pulley and mounted for rotation independent of the driving pulley, a gear fastened to one of said arms of the U, a shaft mounted adjacent the driving shaft and having a gear fastened thereto and in mesh with the first mentioned gear and actuating means for direct action on the second mentioned gear to move said belt changing device into and out of belt engaging position.

10. A mechanism as set forth in claim 1 further characterized in that said unit of machinery is mounted on a support which is tiltable toward the driving pulley with means for tilting the support and further characterized in that said device is generally U-shaped with the arms of the U positioned on opposite sides of the driving pulley and mounted for rotation independent of the driving pulley, a gear fastened to one of said arms of the U, a shaft mounted adjacent the driving shaft and having a gear fastened thereto and in mesh with the first mentioned gear and actuating means for direct action on the second mentioned gear to move said belt changing device into and out of belt engaging position, said actuating means, for direct action on the second gear, being connected to said tiltable support whereby an initial movement of the gears is obtained as and for the purpose described.

11. A mechanism as set forth in claim 1 further characterized in that said unit of machinery is mounted on a support which is tiltable toward the driving pulley with means for tilting the support and further characterized in that said device is generally U-shaped with the arms of the U positioned on opposite sides of the driving pulley and mounted for rotation independent of the driving pulley, said U-shaped member having some teeth or notches on a part of its surface at one end and a stop surface on the other end, a supplemental shaft carried by supports for the driving shaft a bell crank lever pivotally mounted on the supplemental shaft, a link connecting one arm of said lever to the tiltable support, the other arm of the lever having an extension with teeth thereon to normally engage the teeth on said U-shaped member to start its movement as described, a sickle shaped pawl pivoted to the said other arm of the lever and in alignment with the teeth on the U-shaped member for the purpose described and an adjustable stop associated with said lever to hold the belt engaging device in its releasing position.

KIBBEY WHITMAN COUSE.

REFERENCES CITED

The following references are of record in the file of this patent:

UNITED STATES PATENTS

| Number | Name | Date |
|---|---|---|
| 367,891 | Canning | Aug. 9, 1887 |
| 402,758 | Medart | May 7, 1889 |
| 429,877 | Anderson | June 10, 1890 |
| 932,000 | Cressman | Aug. 24, 1909 |
| 1,540,720 | Buckbee | June 2, 1925 |
| 2,311,993 | Olsen | Feb. 23, 1943 |